United States Patent Office 2,999,887
Patented Sept. 12, 1961

2,999,887
PREPARATION OF A C₄H₃Cl COMPOUND FROM A SOLUTION OF COPPER CHLORIDE AND HYDROGEN CHLORIDE SATURATED WITH ACETYLENE
Joseph B. Finlay, Louisville, Ky., assignor to E. I. du Pont de Nemours and Company, Wilmington, Del., a corporation of Delaware
No Drawing. Filed Aug. 25, 1959, Ser. No. 835,830
2 Claims. (Cl. 260—654)

This invention relates to a new composition of matter and more particularly to a chlorinated carbon compound and a process for its preparation from acetylene. This compound is useful as an intermediate for making 2,3-dichloro-1,3-butadiene.

It is known that 2,3-dichloro-1,3-butadiene can be copolymerized with chloroprene to provide elastomers having improved freeze resistance. U.S. Patent 1,965,369 discloses the copolymerization of these two monomers. Heretofore 2,3-dichloro-1,3-butadiene has been prepared from a hydrogen chloride addition product of monovinylacetylene. It would be desirable to provide a simpler alternative process for its preparation.

It is an object of this invention to provide a novel chlorinated carbon compound. A further object is to provide a process for the preparation of this compound. A still further object is to provide a novel chlorinated carbon compound which is useful as a starting material for preparing 2,3-dichloro-1,3-butadiene. Other objects will appear hereinafter.

These and other objects of this invention are accomplished by the novel chlorinated carbon compound which has the empirical formula $C_4H_3Cl$. This compound has a boiling point of 55° C. at 760 mm. Hg pressure, a refractive index $n_D^{20}$ of 1.4525, a density $D_{20}^{20}$ of 0.9938, a density $D_4^{20}$ of 0.9920 and displays parent peaks on the mass spectograph cracking pattern at $m/e$ 86 and 88 with the largest single peak being at $m/e$ 51. The infrared spectrum of this compound is characterized by strong absorption at the following wavelengths: 3.04, 4.72, 6.2 and 11.0 to 11.2μ. There is no significant absorption at 10.85, 11.6 and 11.7μ. Due to the infrared spectrum and the nuclear magnetic resonance spectrum it is believed that this compound is 2-chloro-1-butene-3-yne and corresponds to the structural formula

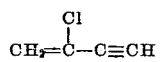

The novel $C_4H_3Cl$ compound of the present invention is prepared by saturating an aqueous copper chloride solution at a temperature ranging from about 25 to 125° C. with acetylene and thereafter removing said $C_4H_3Cl$ compound as it is formed, said copper chloride solution comprising cuprous chloride, cupric chloride, hydrogen chloride, water and a solubilizing agent selected from the group consisting of sodium chloride, potassium chloride, ammonium chloride, magnesium chloride, strontium chloride and barium chloride; with the provisos that from about 0.05 to about 1.0 percent of the copper present in said solution be bivalent, that the mole ratio of cuprous chloride to said solubilizing agent have a value ranging from about 1:1 to 1:3, and that the amount of hydrogen chloride present in said solution be from about 0.1 to about 3.0 percent by weight of said solution; there being provided about one molecule of cupric chloride for about every molecule of acetylene reacting to form said $C_4H_3Cl$ compound. This compound may be readily converted to 2,3-dichloro-1,3-butadiene by the addition of hydrogen chloride.

The physical properties of the novel compound of this invention have been described above. The mass spectograph cracking pattern for this compound has parent peaks at $m/e$ 86 and 88 in the approximate 3:1 ratio which is expected for a chlorine-containing compound of empirical formula $C_4H_3Cl$. The largest single peak at $m/e$ 51 represents a $C_4H_3$ residue. This compound forms a voluminous white precipitate when treated with alkaline mercuric iodide. This compound tends to discolor if unprotected by antioxidants but remains stable for at least a week at room temperature. It becomes thermally unstable and may explode at temperatures above about 130° C. When N-phenyl-β-naphthylamine is present as an antioxidant, this compound displays considerable stability in that it may be distilled at atmospheric pressure and can be stored at −20° C. for several months.

Other antioxidants which may be used to stabilize the novel compound of this invention include those compounds which are suitable for use in stabilizing monovinylacetylene and 2,3-dichloro-1,3-butadiene. Representative examples of phenolic antioxidants which may be employed are 2,2'-methylenebis(6-tert-butyl-4-methyl phenol), 2,2'-methylenebis(6-tert-butyl-4-ethyl phenol), 2,2'-methylenebis [4-methyl-6-(1,1,3,3-tetramethyl)butyl phenol], 4,4'-bis(2-tert-butyl-5-methyl phenol)sulfide, 4,-4' - butylidene - bis(2-tert-butyl-5-methyl phenol), 2,2'-methylenebis(4,6-dimethyl phenol), 2-tert-butyl-4(4-tert-butyl phenyl)phenol, 2-tert-butyl-4-phenyl phenol, 2,6-dibenzyl-4-methyl phenol, 2-benzyl-4-methyl phenol, 2-benzyl-6-tert-butyl-4-methyl phenol, 2-benzyl-6-tert,butyl-4-ethyl phenol, 2,4-dimethyl-6-(1-methyl-1-cyclohexyl) phenol, 2,6-diisopropyl-4-methyl phenol, 2,4-dimethyl-6-isopropyl phenol, 2-tert-butyl-4,6-dimethyl phenol, 2-tert-butyl-4-methyl phenol, 2-(1,1,3,3-tetramethyl butyl)-4-methyl phenol, 2,4,6-trimethyl phenol, 2,6-di-tert-butyl-4-methyl phenol, 2,6-di-tert-butyl-4-ethyl phenol, 4-phenyl phenol, 2,6-diisopropyl phenol, 2,6-di-tert-butyl-4-phenyl phenol, 2,6-di-tert-butyl-4-(4-tert-butyl-phenyl)phenol, 2,-5 - di - tert-butyl-hydroquinone, 2,5-di-tert-amyl-hydroquinone, and alpha-conidendrine. Mixtures of the foregoing may be used. Representative examples of N,N-diaryl secondary amine antioxidants are: N-phenyl-α-naphthylamine, N-phenyl-β-naphthylamine, N,N'-di-α-naphthyl-p-phenylenediamine, and N,N'-di-β-naphthyl-p-phenylenediamine. In addition, the reaction product of 2 molecules of acetone and one molecule of diphenylamine is suitable for stabilizing the $C_4H_3Cl$ compound.

The novel $C_4H_3Cl$ compound can be stabilized by the additives disclosed in U.S. application Serial No. 743,493, filed June 20, 1958 now U.S. Patent No. 2,934,577, in the name of Graham. These additives include: group I metal sulfides such as sodium sulfide (preferred), potassium sulfide, cesium sulfide and copper sulfide; group II metal sulfides such as calcium sulfide, barium sulfide, and mercuric sulfide; transition metal sulfides such as iron sulfide, cobalt sulfide and nickel sulfide. The concentration used is 1 to 1,000 parts per million by weight, Other stabilizers are those disclosed in U.S. application Serial No. 778,312, filed December 5, 1958 now U.S. Patent No. 2,934,577 in the name of Keown. They are organic oximes of aldehydes or ketones of the aliphatic, cycloaliphatic and aromatic series, the oxime preferably containing not more than 10 carbon atoms in the molecule. Representative examples include: acetone oxime, butyraldoxime, butanone oxime, cyclohexanone oxime, benzaldoxime, and acetophenone oxime. About 1 to 1,000 parts per million by weight is employed.

Other monovinylacetylene stabilizers may be used such as allyl amine and nitrosates.

In preparing the novel compound of this invention acetylene is contacted with a well-agitated acidic aqueous mixture containing partially oxidized cuprous chloride. The process should be operated at a temperature ranging between about 25° and 125° C., with a temperature of from 60° to 110° C. being preferred. Atmospheric or superatmospheric pressure can be employed. At temperatures below about 25° C. the $C_4H_3Cl$ compound formed would have a relatively low partial pressure and its removal from the reactor by gas entrainment at atmospheric pressure would be rather slow and by-products would form by subsequent reaction with additional acetylene. It is preferred to operate at temperatures above about 60° C. because there is a tendency for the copper chlorides to precipitate at lower temperatures. On the other hand, at temperatures above 110° C. undesired by-products, such as acetaldehyde, become more prominent. At temperatures about 130–135° C. the $C_4H_3Cl$ compound becomes thermally unstable.

As mentioned above, the aqueous mixture contains cuprous chloride, cupric chloride, hydrogen chloride and a metal chloride solubilizing agent. In order to obtain the $C_4H_3Cl$ compound in good yield, it has been determined that from about 0.05 to 1.0 percent of the copper present in the catalyst mixture must be bivalent with a preferred range being between 0.14 and 0.21 percent. It will be seen from the above figures that most of the copper present in the catalyst mixture exists in the cuprous chloride form. It has been found that the value of the ratio of $Cu^{II}:Cu^{I}$ in the copper chloride mixture has a truly remarkable effect on the course of the process. When it is zero, the gaseous product mixture consists almost entirely of monovinylacetylene. However, when it is only 0.0005, about half the mixture by weight is the novel $C_4H_3Cl$ compound. Under the preferred conditions the value ranges from about 0.0014 to about 0.0021; the $C_4H_3Cl$ compound then amounts to about 97.4 percent by weight of the volatile products. As the proportion of bivalent copper further increases, even less monovinylacetylene is formed. However, increased amounts of side products such as diacetylene and trans-dichloroethylene cut the yield of the $C_4H_3Cl$ compound. When the value of the ratio is above about 0.01, the $C_4H_3Cl$ compound is still formed but the yield is much reduced.

There should be sufficient acetylene pressure to keep the aqueous copper chloride solution saturated with acetylene at all times. When insufficient acetylene is present the rate of reaction falls off sharply. In general, it is preferred to introduce enough excess acetylene so that the conversion to products is about 20 percent. At higher percent conversions there is a tendency for some of the $C_4H_3Cl$ to be consumed by side reactions. It has been determined that when actylene is passed into the aqueous copper chloride solution, there is a rapid initial uptake for several minutes. Thereafter, the uptake slows down and reaction occurs. A plot of the amount of acetylene absorbed by the solution in a closed vessel versus time gives initially a nearly straight line with a steep slope. Later this slope becomes more nearly horizontal and corresponds to the rate of reaction. The intersection point of straight lines extrapolated from these two portions of the graph is proportional to the solubility of the acetylene in the solution. The amount of acetylene needed to saturate a given aqueous copper chloride solution and the time required to react that actylene can thus be determined by carrying out solubility measurements and plotting the data as described.

Since it is desirable that the aqueous catalyst mixture contain the cuprous chloride and cupric chloride in solution, a solubilizing agent should be present. Suitable solubilizing agents include potassium chloride, which is preferred, sodium chloride, ammonium chloride, magnesium chloride, strontium chloride and barium chloride. Mixtures of any of the preceding metal chlorides may be used. In general, it is preferred that the mole ratio of the cuprous chloride (as $Cu_2Cl_2$) to the solubilizing agent have a value ranging from about 1:1 to about 1:3. When less solubilizing agent is used there is a tendency for the cuprous chloride to precipitate from solution; higher amounts are usually unnecessary and uneconomical.

In addition to the above components, the aqueous solution must contain hydrogen chloride. If less than about 0.1 percent is present by weight of the solution, copper acetylides will precipitate when acetylene is introduced. On the other hand, it has been determined that the subject process tends to be hindered by too much acid and the relative proportion of undesired by-products, such as vinyl chloride, increases. Under extremely acidic conditions the reaction does not appear to occur at all. The amount of hydrogen chloride present should be no more than about 3.0 percent by weight. It is preferred that the solution contain enough hydrogen chloride to cause m-cresol purple indicator to turn a faint pink in the absence of acetylene. This amount of hydrogen chloride represents about 0.4 percent by weight.

It is believed that the process may be represented by the following equation:

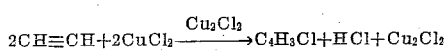

It has been determined that the $C_4H_3Cl$ compound can be made by continually reacting equimolar amounts of acetylene and cupric chloride in the acidic aqueous copper chloride solution. Thus hydrogen chloride and cuprous chloride are both reaction products.

It is preferable to modify the process in order to avoid accumulating hydrogen chloride and to regenerate the cupric chloride. In general, both aims are accomplished by carrying out an oxidation process while the $C_4H_3Cl$ compound is being formed. They may occur in the same vessel or in separate vessels or chambers. Two representative methods are air oxidation and electrolytic oxidation.

When the cupric chloride is regenerated by air oxidation

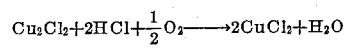

the over-all process for the preparation of the $C_4H_3Cl$ compound can be represented as

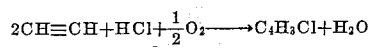

The copper chloride concentration remains unchanged during a run. However, a molecule of hydrogen chloride is consumed for every molecule of $C_4H_3Cl$ formed. Hence, hydrogen chloride must be continually supplied.

When the cupric chloride is electrolytically oxidized

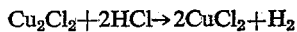

the over-all process for the preparation of the $C_4H_3Cl$ compound can be represented as

Again, the copper chloride concentration remains constant while hydrogen chloride is continually being consumed.

The catalyzed formation of $C_4H_3Cl$ compound should be conducted in a glass- or enamel-lined reactor since most metals will dissolve in the acidic aqueous catalyst mixture. Agitation should be employed and efficient mass transfer is necessary in order to obtain as high a yield of product as possible. It has been determined that catalyst productivity is increased by providing intimate contact between acetylene and the aqueous catalyst mixture, and high-boiling side reaction products are avoided by allowing the $C_4H_3Cl$ compound to escape from the reaction medium before it can react further with acetylene. Thus, it is preferred to remove the $C_4H_3Cl$ from the reaction medium as soon as it is formed. A convenient way to achieve short contact time is to use a continuous flow process wherein the $C_4H_3Cl$ compound and any unreacted acetylene are removed from the catalyst zone.

At a fixed temperature and composition, the catalyst productivity will be proportional to the partial pressure of acetylene. Catalyst productivity will increase with increased amount of dissolved copper but not in direct proportionality. The degree of conversion desired will be determined by the gas through-put per unit volume of catalyst solution.

Once the optimum productivity (lbs. prod./unit volume of catalyst) has been established in relation to catalyst composition and conversion, production rate can be scaled up. It is only necessary to change the catalyst volume in proportion to any change in production rate. Thus, a 3-fold increase in production rate will call for a 3-fold increase in catalyst volume in the reactor. It is assumed, of course, that the same degree of mass transfer is maintained. Productivity and yield decrease rapidly when the agitation in insufficient.

A general procedure for preparing the novel compound of this invention is to mix moisture staturated streams of purified acetylene and oxygen and introduce them into a catalyst solution which has been preheated under nitrogen to 80° C. The oxygen is used to keep the catalyst, i.e. the copper compounds, oxidized to the proper state. In a representative run 1750 cc./minute acetylene was introduced into a catalyst weighing 3341 grams and consisting of 1440 grams of cuprous chloride, 974 grams of potassium chloride, 750 grams of water, 80 grams of copper powder and 97 grams of 37% hydrochloric acid. The heat of reaction liberated thereafter is retained by suitable insulation to keep the temperature between 80–85° C. Reactants and products pass from the reactor through a spray trap slightly warmer than the catalyst solution to prevent condensation. The main off gas stream travels through a trap cooled with crushed solid carbon dioxide where the reaction products condense. The compound $C_4H_3Cl$ is separated by fractional distillation of the condensate. The course of the reaction is controlled, in accordance with composition data provided, by gas chromatography of periodic samples of the off gas stream. The relative proportions of oxygen and acetylene entering the reactor and the acidity of the catalyst are adjusted to make the $C_4H_3Cl$ compound as large a proportion of the product gas as possible. Accordingly, the correct ratio of $Cu^{II}/Cu^{I}$ in the catalyst may be maintained by gassing the catalyst with the right mixture of acetylene, which reduces the catalyst, and oxygen, which oxidizes it. Thus, if the off gas contains trans-dichloroethylene, more acetylene is fed and the catalyst is reduced to its proper state. If the off gas has a high monovinylacetylene content, more oxygen is fed and the catalyst is oxidized to its proper state. Alternatively, the catalyst may be oxidized in a separate vessel through which the catalyst is continuously circulated. With this process little or no oxygen reaches the reactor itself.

The novel compound of this invention can also be prepared using an electrolytic method to regenerate the cupric chloride. The cell is divided into two chambers by a cation premeable membrane. The acidic aqueous copper chloride solution is placed in the anode and an aqueous solution of the solubilizing metal halide is added to the cathode. The membrane keeps the copper from migrating to the cathode. During the run, acetylene and hydrogen chloride are continually introduced into the anode chamber in a 2:1 molar ratio. The $C_4H_3Cl$ formed therein is continually removed. The cuprous chloride continually formed during the reaction is continually oxidized to cupric chloride at the anode electrode. Hydrogen ions migrate through the membrane and are reduced to hydrogen at the cathode. For every gram-molecule of acetylene reacted to form $C_4H_3Cl$, a faraday of electricity will be needed.

The $C_4H_3Cl$ compound of this invention adds hydrogen chloride in the presence of cuprous chloride to give 2,3-dichloro-1,3-butadiene. The reaction may be carried out at room temperature but better conversions are obtained at 50° C. It is preferable to operate at superatmospheric pressure in a rocker bomb or autoclave having a glass or stainless steel liner since the $C_4H_3Cl$ compound is too volatile at 50° C. for convenient operation in an open reactor at atmospheric pressure. A representative catalyst is made from 208 parts, by weight, of concentrated hydrochloric acid (sp. g. 1.19), 25 parts, by weight, of cuprous chloride, and 10 parts, by weight, of ammonium chloride. The 2,3-dichloro-1,3-butadiene may be copolymerized with chloroprene to provide a highly useful elastomer.

The following examples will better illustrate the nature of the present invention; however, the invention is not intended to be limited to these examples. Parts are by weight unless otherwise indicated.

EXAMPLE 1

(A) *Apparatus*

The reaction vessel is a 500 milliliter, 4-neck, creased, round-bottom flask stirred with a blade agitator driven by an air motor at a fast rate. Acetylene is passed through a container of sulfuric acid to remove phosphine and through three water scrubbers to remove acetone and saturate the stream with water. Air is passed through a container of water. Rates of flow of acetylene and air are measured with rotameters. The separate streams are joined at a T and the mixed gases are introduced into the reaction vessel through a single tube. The catalyst solution is prepared and heated to 75° C. under nitrogen using an electric mantle and is passed through a rotameter and into the reaction vessel. During the reaction, the temperature inside the vessel is maintained at about 75–80° C. by the heat of reaction itself. The reaction products and unused acetylene pass from the flask through a spray trap maintained at a temperature 5° above that of the reaction flask. A side stream to the chromatograph passes through a stainless steel tube, 1/8" in diameter which is also maintained 5° C. above the reaction temperature. This is to prevent condensation. The tube through which the chromatograph side stream passes is connected only while sampling, and is dried thoroughly with a stream of air between samples. The main off gas stream passes through an air cooled trap in which some water is collected, and then through a trap cooled with Dry Ice, where the reaction products are collected. The reaction vessel contains tubes to permit introduction of hydrogen chloride, water or copper powder.

(B) *Vapor phase chromatograph conditions*

The progress of the reaction is followed by vapor phase chromatography. The chromatograph used is the Consolidated Model 201. It is operated generally at 90° C. using a 6 foot x 1/4 inch column packed with "Igepal" CA630 alkyl phenoxy polyethyleneoxy ethanol, 30 parts, on Fischer "Columpak," 100 parts. Helium is used as carrier gas at about 35 cc./minute. Approximate elution times under these conditions are shown in Table I.

TABLE I.—CHROMATOGRAPH ELUTION TIMES

| Compound: | Chart inches |
|---|---|
| Air, oxygen | 0.43 |
| Acetylene | 0.58–0.60 |
| Vinyl chloride | 1.15 |
| Monovinylacetylene | 1.55 |
| Acetaldehyde | 1.85 |
| Chloroprene | 4.40 |
| Trans-dichloroethylene | 4.40 |
| $C_4H_3Cl$ | 6.90 |
| Divinylacetylene | 7.5 |

(C) *Preparation of* $C_4H_3Cl$

The well-agitated reaction flask is charged under nitrogen with 180 grams of cuprous chloride, 121.7 grams of potassium chloride, 93.2 grams of water and 3 cc. of 37% hydrochloric acid. The liquid catalyst thereby obtained is heated under nitrogen to 75° C. Acetylene is then introduced for 45 minutes at the rate of 6.85 cc./second. Vapor phase chromatography of the off gas during this period gives a spectrum whose peaks appear at eluate times characteristic of nitrogen, acetylene, vinyl chloride, monovinylacetylene, acetaldehyde, chloroprene and divinylacetylene.

During the following 47 minutes acetylene is introduced at 7.89 cc./second admixed with air; the gas chromatograph of the off gas stream exhibits a new chromatograph peak which appears at an eluate time (6.90 chart inches) characteristic of $C_4H_3Cl$. The peaks characteristic of vinyl chloride, monovinylacetylene, acetaldehyde and chloroprene still remain but are sharply reduced in magnitude. For the remaining 68 minutes acetylene is supplied at the rate of 8.27 cc./second admixed with air. Ten minutes before the reaction is stopped, 5 cc. of hydrogen chloride is introduced into the reaction vessel. In all, 73.5 liters of acetylene is passed into the catalyst during a period of 2 hours and 40 minutes at 75–80° C.

Four cubic centimeters of crude $C_4H_3Cl$ is collected. A center cut, B.P. 55.5° C. (760 mm. Hg), analyzes by gas chromatography for 83.0 percent $C_4H_3Cl$, 0.9 percent chloroprene, 1.05 percent trans-dichloroethylene, 0.8 percent acetaldehyde, 2.9 percent monovinylacetylene, 7.8 percent divinylacetylene, 2.15 percent of the two 1-ethynylbutadiene isomers and traces of other impurities.

EXAMPLE 2

(A) *Apparatus*

The apparatus of Example 1, Part A is employed except that the reaction vessel is 5 liters in size.

(B) *Preparation of* $C_4H_3Cl$ 1800 grams of cuprous chloride, 1217 grams of potassium chloride, 932 grams of water, 50 grams of copper powder and 20 cc. of butyl Carbitol are charged into the well-agitated dry reactor under a nitrogen atmosphere and subsequently heated to 70° C. After 75 cc. concentrated hydrochloric acid (specific gravity 1.19) has been added, the liquid catalyst is ready. The Carbitol acts as a tar solvent.

A mixture of acetylene and air is introduced thereafter while the temperature of the reaction vessel is maintained at 70–75° C. Samples of the product gas stream are removed every half hour for analysis by vapor phase chromatography. Whenever the vinyl chloride peak on the chromatograph falls below 1.0 unit, 10 cc. of hydrochloric acid is added to the reaction vessel. Table II, which follows, shows the operating details:

TABLE II

| Time (min.) | Acetylene (cc./min.) | Air (cc./min.) | Hydrochloric Acid (cc.) | Temperature (° C.) |
|---|---|---|---|---|
| 0 | 1,200 | 1,300 | ------ | 71 |
| 5 | 1,200 | 1,300 | ------ | 71 |
| 34 | 1,200 | 1,300 | 10 | 76 |
| 50 | 1,200 | 1,300 | 5 | ------ |
| 65 | 1,200 | 1,300 | ------ | 75 |
| 80 | 1,200 | 1,300 | 10 | ------ |
| 84 | 1,200 | 1,300 | ------ | 75 |
| 120 | 1,200 | 1,300 | 10 | ------ |
| 182 | 1,200 | 600 | ------ | 70 |
| 201 | 1,200 | 600 | 10 | ------ |
| 212 | 1,200 | 1,300 | ------ | 70 |
| 230 | 1,200 | 1,300 | 10 | ------ |
| 240 | 1,000 | 1,300 | ------ | 70 |
| 242 | 1,000 | 1,300 | ------ | ------ |
| 264 | 1,000 | 1,300 | 10 | ------ |
| 274 | 1,000 | 1,430 | 5 | 71 |
| 280 | 1,000 | 1,430 | ------ | 71 |
| 302 | 1,000 | 1,430 | ------ | 71 |
| 313 | 1,000 | 1,430 | ------ | 71 |

NOTE.—Gas flow stopped.

N-phenyl-alpha-naphthylamine is added to the oil from the product stream. Fractional distillation is then carried out at atmospheric pressure while a protective sweep of nitrogen is maintained. A foreshot boiling below 55° C. contains much monovinylacetylene. The main fraction boiling between 55 and 61° C. contains about 81.2 percent $C_4H_3Cl$, 13.6 percent trans-dichloroethylene, 4.5 percent chloroprene and 0.6 percent divinylacetylene and its isomers.

(C) *Reaction of* $C_4H_3Cl$ *with hydrogen chloride to give 2,3-dichloro-1,3-butadiene*

A 500-ml. round-bottom, 4-neck glass reaction vessel is used equipped with a gas inlet, a dropping funnel, a water-cooled condenser, a glass agitator, and a thermometer. A mixture of nitrogen and nitric oxide is continually introduced through the gas inlet to provide an inert atmosphere. To this flask is added with stirring, in turn, a solution of 30 grams of cuprous chloride in 200 grams of 37% hydrochloric acid and 3 grams of copper powder. The mixture obtained is heated to 45° C. Then 6.4 grams of crude $C_4H_3Cl$, prepared in Part B above, is added with stirring over a 2-minute period. Most of it distills into the receiver at once. It is returned to the reaction flask. Once again it appears to distill rapidly. When the condensate is again recycled only a small amount of distillate subsequently appears. The reaction mixture is stirred for about 15 minutes while heat is applied. About 0.5 cc. of oil is collected in the receiver; a cold trap (packed with crushed solid carbon dioxide) beyond the receiver contains an additional 3 cc. of oil.

Vapor phase chromatography indicates that these oils contain 2,3-dichloro-1,3-butadiene.

EXAMPLE 3

(A) *Apparatus*

The equipment described in Part A of Example 1 is used except that the flask is 3-liter in size, and oxygen is used in place of air.

(B) *Preparation of* $C_4H_3Cl$ (1) The dry, well-agitated reaction vessel is charged with a catalyst mixture consisting of 1440 grams of cuprous chloride, 974 grams of potassium chloride, 750 grams of water and 40 grams of copper powder. The agitated catalyst mixture is heated to 70° C. and 97 grams of 37% hydrochloric acid and 40 grams of copper powder are added. Acetylene is then passed into the reaction vessel at the rate of 1750 cc./minute. Forty minutes later, oxygen is introduced into the acetylene stream. Thereafter a mixture of oxygen and acetylene is passed through the reactor which is maintained at a temperature between 80 and 85° C. 37% hydrochloric acid is added from time to time. The details are given in Table III.

TABLE III

| Time (min.) | Acetylene Rate (cc./min.) | Oxygen Rate (cc./min.) | 37% HCl (ml.) |
|---|---|---|---|
| 0 | 1,752 | 0 | 0 |
| 40 | 1,752 | 180 | ------ |
| 71 | 1,752 | 372 | 5 |
| 86 | 1,752 | 372 | 15 |
| 104 | 1,752 | 372 | 25 |
| 108 | 1,752 | 372 | a 25 |
| 117 | 996 | 372 | ------ |
| 140 | 1,752 | 372 | ------ |
| 158 | 1,752 | 372 | 25 |
| 184 | 1,752 | 372 | 25 |
| 210 | 1,752 | 372 | 25 |
| 290 | 1,752 | 240 | 10 |
| 297 | 1,752 | 240 | 10 |
| 358 | 1,752 | 240 | b 25 |
| 380 | 1,752 | 240 | 25 |
| 395 | 1,752 | 120.6 | ------ |
| 440 | 1,752 | 120.6 | 30 |
| 450 | 1,752 | 120.6 | c 25 |
| 460 | 1,752 | 240 | ------ |
| 470 | 1,752 | 240 | d |
| 525 | 1,752 | 240 | 50 |
| 574 | 1,752 | 240 | 25 |
| 602 | 1,752 | 120.6 | 25 |
| 610 | 1,752 | 240 | (f) |
| 630 | (e) | | | a 10 cc. butyl Carbitol and 55 g. of copper powder added.
b 22 g. of copper powder added.
c 56 g. of copper powder added.
d 100 cc. butyl Carbitol added.
e Shut down.
f Removed 100 cc. of catalyst.

Table IV shows the variation in the intensity of the gas chromatograph bands during the above run. An increase in the peak height of a component indicates that the relative proportion of the component in the mixture has grown.

TABLE IV.—PEAK HEIGHTS

| Time | MVA | DVA | VC | $C_4H_3Cl$ |
|---|---|---|---|---|
| <57 | 1,575 | 225 | 28 | 0 |
| 57 | 1,380 | 180 | 20 | 159 |
| 82 | 730 | 60 | 7.5 | 117 |
| 97 | 855 | 72 | 14 | 310 |
| 117 | 930 | 54 | 113 | 108 |
| 136 | 1,000 | 80 | 62 | 340 |
| 155 | 1,350 | 114 | 21 | 219 |
| 179 | 1,100 | 90 | 45 | 192 |
| 195 | 830 | 69 | 101 | 162 |
| 217 | 650 | 42 | 140 | 120 |
| 239 | 700 | 35 | 130 | 380 |
| 261 | 940 | 40 | 69 | 285 |
| 290 | 1,395 | 105 | 24 | 189 |
| 377 | 1,450 | 195 | 18 | 277 |
| 401 | 1,830 | 183 | 57 | 276 |
| 445 | 1,740 | 142.5 | 54 | 159 |
| 496 | 1,710 | 189 | 24 | 255 |
| 562 | 1,740 | 165 | 27 | 180 |
| 596 | 1,780 | 207 | 35 | 140 |
| 624 | 1,395 | 130 | 44 | 170 |

| | MVA | DVA | VC | $C_4H_3Cl$ |
|---|---|---|---|---|
| Collected During Run____g__ | 3,800 | 1,800 | 20 | 1,800 |

MVA=Monovinylacetylene.
DVA=Divinylacetylene.
VC=Vinyl Chloride.

(2) The procedure of (1) above is continued with the introduction of gaseous hydrogen chloride. Table V presents the details.

TABLE V

| Time (min.) | Temp. (° C.) | Acetylene Rate (cc./min.) | Oxygen Rate (cc./min.) | HCl Rate (cc./min.) |
|---|---|---|---|---|
| 0 | 77 | 1,752 | 240 | 0 |
| 55 | ------ | 1,752 | 240 | 240 |
| 70 | 82 | 1,752 | 126 | 230 |
| 82 | ------ | 1,752 | 126 | 625 |
| 105 | ------ | 1,752 | 126 | 625 |
| 115 | ------ | 1,752 | 126 | 230 |
| 120 | 82 | 1,752 | 240 | 230 |

35 grams of oil is collected in the receiver. Its major components are: monovinylacetylene, divinylacetylene, vinyl chloride and $C_4H_3Cl$.

626 grams of catalyst and high boiling product material is removed from the reaction vessel. The run is continued at 80° C. according to the procedure summarized in Table VI.

TABLE VI

| Time (min.) | Acetylene Flow (cc./min.) | Oxygen Feed (cc./min.) | HCl Feed (cc./min.) |
|---|---|---|---|
| 0 | 1,750 | 240 | 0 |
| 70 | 1,750 | 830 | 0 |
| 80 | 1,750 | 830 | 93 |
| 94 | 1,750 | 830 | 230 |
| 100 | 1,750 | 830 | 230 |
| 113 | 1,270 | 830 | 395 |
| 140 | 1,750 | 830 | 300 |
| 160 | 1,750 | 1,050 | 300 |
| 173 | 1,750 | 1,050 | 460 |
| 185 | 1,750 | 1,000 | 460 |
| 192 | 1,750 | 1,000 | 360 |
| 215 | 1,750 | 910 | a 350 |
| 228 | 1,750 | 1,000 | 350 | a 85 g. of copper powder added.

Analysis of the product gas stream gives the results tabulated below. The catalyst is becoming more oxidized as the run proceeds, and with the disappearance of copper powder as the result of a slight overbalance of oxygen, the proportion of trans-dichloroethylene by-product increases while the proportion of monovinylacetylene decreases. After 215 minutes, a large excess of copper powder is added. The trans-dichloroethylene formation ceases and some monovinylacetylene formation again occurs.

| Time (min.) | Wt. Percent Acetylene | Wt. Percent MVA | Wt. Percent DVA | Wt. Percent VC | Wt. Percent DCE | Wt. Percent $C_4H_3Cl$ |
|---|---|---|---|---|---|---|
| 109 | 63.7 | 6.5 | 0 | 0.4 | 0 | 29.2 |
| 132 | 70.4 | 2.0 | 0 | 0.9 | .2 | 26.5 |
| 170 | 64.3 | 0.1 | 0 | 0.3 | 2.9 | 31.1 |
| 213 | 71.7 | 0 | 0 | 1.3 | 8.1 | 15.1 |
| 224 | 73.5 | 14.5 | 1.8 | 1.1 | .9 | 8.2 |

MVA=Monovinylacetylene.
DVA=Divinylacetylene.
VC=Vinyl Chloride.
DCE=Trans-dichloroethylene.

(3) The run is resumed the following day according to the procedure summarized in Table VII.

TABLE VII

| Time (min.) | Acetylene Feed (cc./min.) | Oxygen Feed (cc./min.) | HCl Feed (cc./min.) |
|---|---|---|---|
| 0 | 1,100 | 1,430 | 225 |
| 10 | 1,100 | 590 | 475 |
| 25 | 1,100 | 900 | 475 |
| 50 | 1,100 | 700 | 300 |
| 72 | 1,100 | 700 | 300 |
| 77 | 1,300 | 700 | 225 |
| 85 | 1,300 | 600 | 225 |
| 95 | 1,300 | 600 | 225 |
| 106 | 1,300 | 600 | 225 |

From this run of 126 minutes, 62.2 grams of condensate is obtained. Its analysis by gas chromatography indicates: 71.7 percent by weight $C_4H_3Cl$, 1.7 percent chloroprene and trans-dichloroethylene, 0.85 percent vinyl chloride, 17.6 percent monovinylacetylene, 0.8 percent divinylacetylene, 4.0 percent acetaldehyde, 0.45 percent acetylene and traces of unidentified compounds. 60 grams of this oil is fractionally distilled from a still pot which has been flushed with nitrogen. Nitrogen is used as the ebullating gas. Three fractions are collected:

| Fraction | Wt. (g.) | B.P. (° C.) | Wt. Percent MVA | Wt. Percent Ald. | Wt. Percent CP+DCE | Wt. Percent $C_4H_3Cl$ |
|---|---|---|---|---|---|---|
| 1 | 2 | 50-54 | 3.7 | 4.9 | 3.9 | 87 |
| 2 | 26.3 | 55 | 0.40 | 0.52 | 0.84 | 98.2 |
| 3 | 3.7 |  | 3.5 |  | 1.3 | 94.3 |

MVA=Monovinylacetylene.
CP=Chloroprene.
DCE=Trans-dichloroethylene.
Ald.=Acetaldehyde.

In all, 35.6 grams of $C_4H_3Cl$ is obtained giving a yield of 68.5 percent (based on 60 grams of oil). The second fraction exhibits the following physical properties: boiling point 55° C. (760 mm. Hg), refractive index $n_D^{20}$, 1.4525; density $D_{20}^{20}$, 0.9938; density $D_4^{20}$, 0.9920. A small portion of cut 2 is redistilled to give 5.5 cc. of oil to which 6.5 mg. of N-phenyl-alpha-naphthylamine antioxidant is added. The stabilized sample contains 0.5 percent by weight sym-dichloroethylene, 0.3 percent acetaldehyde and 0.6 percent chloroprene according to mass spectrographic analysis. Elementary analysis indicates an empirical formula of $C_4H_3Cl$.

Calcd.: C, 55.5; H, 3.48; Cl. 41.1.
Found: C, 54.9; H, 3.65; Cl, 41.75.

(C) *Reaction of $C_4H_3Cl$ with hydrogen chloride to give 2,3-dichloro-1,3-butadiene*

A catalyst solution is prepared from 175 cc. concentrated hydrochloric acid (sp. gr. 1.19), 25 g. $Cu_2Cl_2$, 10 g. $NH_4Cl$ and 3 g. copper powder. Portions of this mixture are sealed in glass tubes with small amounts of the $C_4H_3Cl$ prepared in Part B3 above. A control is prepared in which the catalyst contains only the hydrochloric acid. The tubes are mounted in a horizontal position on clamps extending from a vertical rod actuated by a vacuum-operated windshield-wiper motor, and shaken at the rate of one cycle per second for specified lengths of time. Various reaction temperatures are maintained with a water bath. At the end of the reaction time, the tubes are opened and the oil phase is analyzed by vapor phase chromatography. Amounts of catalyst and $C_4H_3Cl$ used are given, together with reaction times and temperatures in Table VIII.

TABLE VIII.—REACTION OF 2-CHLORO-1-BUTENE-3-YNE WITH HCl IN SEALED TUBES

| | Temp.° C. | Time Hours | $C_4H_3Cl$, cc. | Catalyst Type | cc. |
|---|---|---|---|---|---|
| 1 | 27 | 2 | 1.5 | Cu | 5.0 |
| 2 | 27 | 18 | 2.5 | Cu | 5.0 |
| 3 | 27 | 18 |  |  |  |
|  | 40 | 18 | 2.5 | Cu | 5.0 |
| 4 | 50 | 3 | 1.0 | Cu | 7.5 |
| 5 | 50 | 3 | 1.0 | HCl | 7.5 |

Cu catalyst made from 175 cc. conc. hydrochloric acid, 25 g. $Cu_2Cl_2$, 10 g. $NH_4Cl$.
HCl is conc. hydrochloric acid (sp. g. 1.19).

In each run above the $C_4H_3Cl$ compound is converted to 2,3-dichloro-1,3-butadiene.

EXAMPLE 4

*Oxidation of acetylene to $C_4H_3Cl$ with cupric chloride*

A 500-ml. 5-neck, creased flask was fitted with an air driven true-bore agitator consisting of a pair of four-bladed impellers with opposed pitches, an acetylene blow leg extending almost to the bottom of the flask, a heated splash head, a 50-ml. dropping funnel wrapped with heating tape and a thermometer.

The outlet from the splash head led through an air-cooled trap, two traps cooled in Dry Ice, a gas measuring bubble burette and finally to a vent.

The acetylene feed system consisted of a calibrated rotameter and a series of liquid scrubbers (water, Fieser's solution, 30% sulfuric acid, and water).

The catalyst was prepared by agitating a mixture of 144 grams cuprous chloride, 97.5 grams potassium chloride, 75 grams $H_2O$, 6 grams copper powder, 9.6 grams of 37% hydrochloric acid in the creased flask at 80° C. After two hours the catalyst was completely reduced to a homogeneous straw colored liquid. The acidity was adjusted to a faint pink on metacresol paper by the addition of 2 ml. 5 N potassium hydroxide. Butyl Carbitol (10 g.) was added as a tar solvent. A concentration of cupric ion was then established by adding 4.0 g. (0.0235 mole) cupric chloride dihydrate. The catalyst turned dark brown. The entire system was protected with a nitrogen blanket during all operations.

The oxidizer solution was prepared by heating a mixture of 32.2 g. (0.189 mole) cupric chloride dihydrate, 18 ml. water and 11.9 g. potassium chloride to 80°. The homogeneous liquid was transferred to the preheated dropping funnel and held at 80–90° C. during the course of the addition.

Acetylene was then introduced through the blow leg at a constant rate of 4.1 m. moles per minute (100 ml./min.). Within a few minutes the color of the catalyst changed to a pale brown. The dropwise addition of the cupric chloride oxidized solution was then begun. The rate was continually adjusted in order to maintain the pale brown color in the catalyst. Temperature was maintained at 81–84° C.

The off-gas was measured from time to time with the bubble burette. From these values an estimate of recovered acetylene and hence converted acetylene was made.

In the course of the two hour run about 180 m. moles of acetylene was converted and a total of 212 m. moles cupric chloride consumed. After the addition of cupric chloride was completed the acetylene flow was continued until the catalyst became straw colored i.e., was completely reduced. The conversion of acetylene fell from about 61 percent at the beginning to about 27 percent at the end and average conversion was 35 percent. This is expected as a result of the increased amount of acid formed in the reaction.

The product condensed in the first Dry Ice trap was stripped of low boilers by carefully allowing it to warm to room temperature. There remained 6.0 g. of a colorless mobile oil which was analyzed by vapor phase chromatography as shown in Table IX.

TABLE IX.—VAPOR PHASE CHROMATOGRAPHY ANALYSIS OF CRUDE PRODUCT STRIPPED OF LOW BOILERS

| Compound: | Wt. percent |
|---|---|
| Vinyl chloride | 2.57 |
| Monovinyl acetylene | 3.04 |
| Acetaldehyde | 9.30 |
| Vinylidene chloride | 2.03 |
| Trans-dichloroethylene | 8.22 |
| Chloroprene | 4.68 |
| $C_4H_3Cl$ | 74.3 |
| Divinylacetylene | 0.6 |

On the basis of this analysis the yield of $C_4H_3Cl$ is 4.46 g. (51.6 m. mole); 57.3 percent based on acetylene converted; and 48.7 percent based on cupric ion consumed.

The crude product was fractionally distilled and a fraction boiling at 55° C. collected. It was shown to be $C_4H_3Cl$ by comparison with the standard spectrum of authentic $C_4H_3Cl$. It had a refractive index $n_D^{20}$ of 1.4525, a density $D_{20}^{20}$ of 0.9938 and a density $D_4^{20}$ of 0.9920.

EXAMPLE 5

This example demonstrates the relation of the composition of the volatile products to the $Cu^{II}$ concentration in the catalyst.

Nine liters of a catalyst solution is introduced into a 12-liter round-bottom glass flask equipped with an agitator, an outlet tube and a heating mantle. This solution consists of potassium chloride and cuprous chloride (1.9 mole ratio), 36 percent by weight water, and 0.5 percent by weight hydrogen chloride. During the run known amounts of cupric chloride are added from time to time through an opening while vigorous agitation is maintained. The catalyst mixture is allowed to flow from a reservoir through an outlet tube to a 2-way stop-cock. Samples are removed for $Cu^{II}$ analysis. The remainder of the catalyst solution is allowed to flow through a tube into a creased 250-ml. glass reaction flask equipped with a paddle agitator and a heating mantle. The catalyst is continually withdrawn from the base of the reactor through a goose-neck tube and collected in a reservoir. Acetylene gas is continually introduced through a tube near the bottom of the reactor at a rate sufficient to attain a conversion of about 20 percent. The off-gases leave the reactor through exit-tube. A 2-way stop-cock permits removal of samples through a side-arm for analysis by a vapor phase chromatography apparatus. The rest of the volatile products are removed through an outlet tube and collected in traps.

In carrying out the run, the large reservoir of catalyst is placed above the reactor and the catalyst is allowed to flow from the reservoir through the reactor at a constant rate. Acetylene is passed through the reactor at a rate such that 20 percent is converted to products. During the run samples of catalyst are withdrawn from the reservoir for $Cu^{II}$ analysis (iodometric) and, immediately after each of these samples has been taken, a sample of the off-gas is analyzed by vapor phase chromatography. The $Cu^{II}$ concentration in the catalyst is varied by the addition of cupric chloride to the agitated cuprous chloride reservoir.

The reaction flask has a catalyst hold-up of 120 cc. The acetylene feed rate is 450 cc./minute and the catalyst through-put is 80 cc./minute. The reaction temperature is 75–80° C. The agitator is operated at 950 to 1500 r.p.m.

Table X discloses the results obtained.

TABLE X

| Percent $Cu^{II}$ (on total catalyst) | $Cu^{II}/Cu^{I}$ | Product Composition by VPC, percent | | | |
|---|---|---|---|---|---|
| | | MVA [1] | $C_4H_3Cl$ | Diacetylene | TDCE [2] |
| 0.1 | .00425 | 3.9 | 96.2 | | |
| 0.14 | .0060 | 2.7 | 97.4 | | |
| 0.21 | .0089 | 1.7 | 97.4 | 1.0 | |
| 0.31 | .0132 | tr. | 92.1 | 5.1 | 2.8 |
| 0.51 | .0217 | tr. | 88.6 | 7.6 | 3.8 |
| 0.78 | .0332 | tr. | 76.5 | 14.7 | 8.9 |

[1] MVA=monovinylacetylene.
[2] TDCE=trans-dichloroethylene.

EXAMPLE 6

(A) *Electrolytic preparation of $C_4H_3Cl$*

This example demonstrates the use of electricity as a method of controlling the ratio of cupric chloride to cuprous chloride during the preparation of the $C_4H_2Cl$ compound. A two-compartment cell is employed divided by a cation-permeable membrane.

Each cell is essentially a 250 ml. 2-neck flask (45/50 and 24/40 joints) with a two inch opening on the side. The opening is surrounded by a ground glass flange. A cation-permeable membrane is secured between the ground surfaces by means of pinch clamps. Each cell is equipped with a true-bore type agitator electrode assembly consisting of a hollow glass tube fitted at the lower end with a plug through which runs a platinum wire externally joining a circular platinum disk 1.4 inches in diameter and 1.0 mm. thick. Mercury above the plug serves as a contact between the platinum wire and a bare copper wire leading from the tube to a current source. By the use of these rotating electrodes the effects of concentration potentials is minimized. The entire cell is immersed in a water bath.

Direct current is supplied to the cell from a rectifier. The circuitry includes a voltmeter and an ammeter. The current is adjusted by means of the Variac.

(B) *Electrolysis of cuprous chloride solution*

A simple electrolysis of a cuprous chloride catalyst is performed in the following manner. The cell is assembled with a cation-permeable membrane in place. The membrane is a woven nylon sheet impregnated with a sulfonated resin of styrene and divinyl benzene (as the sodium salt).

The cathode compartment is charged with 309 g. of warm 28.6% aqueous potassium chloride and fitted with a gas burette. The anode compartment is filled with a completely reduced cuprous chloride catalyst prepared by heating a mixture of:

182 g. cuprous chloride
123 g. potassium chloride
95 g. water
8 g. copper powder
12 g. hydrochloric acid (37%)

to 80°. The electrolytic cell is maintained at about 70° in a water bath. The electrodes are started rotating and a direct current of 1.0 ampere is turned on. The applied potential varies between 3.0 and 5.8 volts. The current is allowed to flow for known lengths of time after which the gas evolved at the cathode is measured, and samples of the catalyst are withdrawn from the anode compartment and analyzed for $Cu^{II}$ produced at the anode. The gas evolved at the cathode is identified as hydrogen by examining a sample in the mass spectrometer and by showing that it is combustible. No gas is evolved at the anode. The hydrogen evolved is measured by means of a gas burette attached to the cathode compartment. The results, which are summarized in Table XI, are in complete accord with the electrolytic scheme.

TABLE XI.—ELECTROLYSIS OF CUPROUS CHLORIDE CATALYST

| Elapsed Time (min.) | Electricity Passed (millifaradays) | $H_2$ Evolved (milliequiv.) | Percent $Cu^{II}$ in Catalyst | |
|---|---|---|---|---|
| | | | Calc. | Found |
| 15 | 9.33 | 9.3 | 0.14 | 0.30 |
| 30 | 18.7 | 17.8 | 0.29 | 0.51 |
| 51 | 31.7 | 30.9 | 0.50 | 0.64 |
| 65 | 40.3 | 40.3 | 0.64 | 0.73 |

(C) *Preparation of $C_4H_3Cl$ by electrolysis*

The electrolytic apparatus described above is modified by adding an acetylene blow leg and a treated splash head to the anode half-cell. The outlet leads to a three-way stop-cock through which the off gases are routed to a Dry Ice trap or to the vapor fractometer. In this case the membrane is a sheet of Amberplex C-1, a sulfonated polystyrene-divinylbenzene copolymer.

The cathode compartment is filled with 307 g. 28.6% potassium chloride solution. The anode is charged with 445 g. cuprous chloride catalyst prepared according to the following recipe:

225 g. cuprous chloride
152 g. potassium chloride
117 ml. water
11 g. copper powder
15 ml. 37% hydrochloric acid
20 ml. butyl carbitol.

The entire cell is placed in a water bath thermostatted at 78–80° C.

An initial $Cu^{II}$ concentration is established by electrolyzing at 1.0 ampere (3.0 volts) for 30 minutes. The electrolysis is resumed at 1.0 amp. while acetylene is passed into the anode compartment. Vapor phase analysis of the off gas (see chromatograph Sample No. 2, Table XII) shows a low $C_4H_3Cl$/monovinylacetylene ratio indicating that acetylene is being converted more rapidly than the catalyst is being electrolyzed. The current is then increased to 2.0 amperes at 97 minutes. The three subsequent chromatograph analyses show increasing ratios of divinylacetylene/monovinylacetylene indicating that the electrolysis rate is overtaking with the conversion rate. The reaction is stopped after 220 minutes.

TABLE XII.—PREPARATION OF $C_4H_3Cl$ BY ELECTROLYSIS

| Total Elapsed Time (Min.) | Input $C_2H_2$ (m. mole) | Electricity | | | Evolved $H_2$ (meq.) | Chromatograph Sample No. | $\frac{C_4H_3Cl}{MVA}$ Ratio |
| --- | --- | --- | --- | --- | --- | --- | --- |
| | | Volt | Amp. | Milli-Faradays | | | |
| 30 | 0 | 3.0 | 1.0 | 18.7 | 14.7 | | |
| 45 | 66.1 | 3.2 | 1.0 | 28.0 | 23.2 | | |
| 48 | | | | | | 1 | unknown |
| 70 | 202 | 3.0 | 1.0 | 43.5 | 37.9 | | |
| 84 | | | | | | 2 | 0.678 |
| 97 | | 4.4 | 2.0 | | | | |
| 145 | 608 | 4.4 | 2.0 | 120 | 110 | | |
| 155 | | | | | | 3 | 1.11 |
| 188 | | | | | | 4 | 1.50 |
| 216 | | | | | | 5 | 2.13 |
| 220 | 1,015 | 4.9 | 2.0 | 207 | 188 | | |

The liquid which condenses in the Dry Ice trap is stripped of low boilers to leave 4.2 g. of colorless oil which contains 61.9 percent weight percent $C_4H_3Cl$. The yield of $C_4H_3Cl$ corrected for material lost in taking the VPA samples, is 40 percent based on electrical current passed. The $C_4H_3Cl$ compound obtained has the following physical properties: boiling point 55° C. (760 mm. Hg), refractive index $n_D^{20}$ 1.4525, density $D_{20}^{20}$ 0.9938 and density $D_4^{20}$ 0.9920. The mass spectograph cracking pattern for this compound has parent peaks at about $m/e$ 86 and 88 with the largest single peak being at $m/e$ 51.

As many widely different embodiments of this invention may be made without departing from the spirit and scope thereof, it is to be understood that this invention is not limited to the specific embodiments thereof except as defined in the appended claims.

What is claimed is:

1. A process for preparing a chlorinated carbon compound having the empirical formula $C_4H_3Cl$, a boiling point of 55° C. at 760 mm. Hg pressure, a refractive index $n_D^{20}$ of 1.4525, a density $D_{20}^{20}$ of 0.9938, a density $D_4^{20}$ of 0.9920, a mass spectograph cracking pattern which displays parent peaks at $m/e$ 86 and 88 with the largest single peak being at $m/e$ 51 and having an infrared spectrum characterized by strong absorption at 3.04, 4.72, 6.2 and 11.0 to 11.2μ wavelengths, which comprises saturating an aqueous copper chloride solution at a temperature ranging from about 25 to 125° C. with acetylene and thereafter removing said $C_4H_3Cl$ compound as it is formed, said copper chloride solution comprising cuprous chloride, cupric chloride, hydrogen chloride, water and a solubilizing agent selected from the group consisting of sodium chloride, potassium chloride, ammonium chloride, magnesium chloride, strontium chloride and barium chloride; with the provisos that from about 0.05 to about 1.0 percent of the copper present in said solution be bivalent, that the mole ratio of cuprous chloride to said solubilizing agent have a value ranging from about 1:1 to 1:3, and that the amount of hydrogen chloride present in said solution be from about 0.1 to about 3.0 percent by weight of said solution; there being provided about one molecule of cupric chloride for about every molecule of acetylene reacting to form said $C_4H_3Cl$ compound.

2. A process of preparing 2,3-dichloro-1,3-butadiene which comprises reacting, in the presence of cuprous chloride, hydrogen chloride with a chlorinated carbon compound having the empirical formula $C_4H_3Cl$, a boiling point of 55° C. at 760 mm. Hg pressure, a refractive index $n_D^{20}$ of 1.4525, a density $D_{20}^{20}$ of 0.9938, a density $D_4^{20}$ of 0.9920, a mass spectograph cracking pattern which displays parent peaks at $m/e$ 86 and 88 with the largest single peak being at $m/e$ 51 and having an infrared spectrum characterized by strong absorption at 3.04, 4.72, 6.2 and 11.0 to 11.2μ wavelengths.

References Cited in the file of this patent

UNITED STATES PATENTS 1,967,864   Jacobson    July 24, 1934

FOREIGN PATENTS 787,904   Great Britain    Dec. 18, 1957

UNITED STATES PATENT OFFICE
CERTIFICATION OF CORRECTION

Patent No. 2,999,887                                                September 12, 1961

Joseph B. Finlay

It is hereby certified that error appears in the above numbered patent requiring correction and that the said Letters Patent should read as corrected below.

Column 3, line 3, for "Patent No. 2,934,577" read -- Patent No. 2,947,795 --; column 5, line 74, for "premeable" read -- permeable --; column 13, line 73, for "$C_4H_2Cl$" read -- $C_4H_3Cl$ --; column 16, after line 61, insert the following:

OTHER REFERENCES

Shostakovskii et al, "Izvest. Akad. Nauk SSR, Otdel, Khim, Nauk," 1958, p. 519.

Georgieff et al, "Canadian Journal of Chemistry," 36, Sept. 1958, pp. 1280-3.

Signed and sealed this 17th day of April 1962.

(SEAL)
Attest:

ESTON G. JOHNSON
Attesting Officer

DAVID L. LADD
Commissioner of Patents